(12) United States Patent
Panteleev et al.

(10) Patent No.: US 10,142,999 B2
(45) Date of Patent: Nov. 27, 2018

(54) RESOURCE SELECTION IN DEVICE TO DEVICE COMMUNICATION

(71) Applicant: Intel IP Corporation, Santa Clara, CA (US)

(72) Inventors: Sergey Panteleev, Nizhny Novgorod (RU); Mikhail Shilov, Nizhny Novgorod (RU); Alexey Khoryaev, Nizhny Novgorod (RU); Debdeep Chatterjee, Mountain View, CA (US)

(73) Assignee: Intel IP Corporation, Santa Clara, CA (US)

( * ) Notice: Subject to any disclaimer, the term of this patent is extended or adjusted under 35 U.S.C. 154(b) by 76 days.

(21) Appl. No.: 15/023,063

(22) PCT Filed: Sep. 26, 2014

(86) PCT No.: PCT/US2014/057896
§ 371 (c)(1),
(2) Date: Mar. 18, 2016

(87) PCT Pub. No.: WO2015/065632
PCT Pub. Date: May 7, 2015

(65) Prior Publication Data
US 2016/0234855 A1    Aug. 11, 2016

Related U.S. Application Data

(60) Provisional application No. 61/898,425, filed on Oct. 31, 2013.

(51) Int. Cl.
*H04W 72/10*   (2009.01)
*H04W 76/18*   (2018.01)
(Continued)

(52) U.S. Cl.
CPC .......... *H04W 72/10* (2013.01); *H04B 17/318* (2015.01); *H04J 3/1694* (2013.01);
(Continued)

(58) Field of Classification Search
None
See application file for complete search history.

(56) References Cited

U.S. PATENT DOCUMENTS

| | | |
|---|---|---|
| 2010/0240312 A1 | 9/2010 | Peng et al. |
| 2012/0051315 A1 | 3/2012 | Wang et al. |
| 2014/0213186 A1* | 7/2014 | Gage ..................... H04W 4/023 455/41.2 |

FOREIGN PATENT DOCUMENTS

| | | |
|---|---|---|
| WO | 2010097645 A1 | 9/2010 |
| WO | 2013075340 A1 | 5/2013 |
| WO | 2013077684 A1 | 5/2013 |

OTHER PUBLICATIONS

International Search Report and Written Opinion for International Application No. PCT/US2014/057896 dated Jan. 8, 2015; 14 pages.
(Continued)

*Primary Examiner* — Peter Chen
(74) *Attorney, Agent, or Firm* — Schwabe, Williamson & Wyatt, P.C.

(57) ABSTRACT

A wireless communication device is configured to perform resource allocation of device-to-device (D2D) communication in a UE. Synchronization establishing circuitry is provided to acquire radio resource synchronization and to establish a time-frequency resource grid having resource units allocation to a D2D communication. Signal metric evaluation circuitry is provided to evaluate resource unit(s) of a received signal using a signal metric when the time-frequency resource grid has been established. Radio resource selection circuitry is provided to select a time resource of the time-frequency resource grid for allocation
(Continued)

to a D2D communication depending upon a result of the resource unit evaluation. Other embodiments may be described and claimed.

19 Claims, 11 Drawing Sheets

(51) Int. Cl.

| | | |
|---|---|---|
| H04W 76/10 | (2018.01) | |
| H04W 76/19 | (2018.01) | |
| H04W 76/15 | (2018.01) | |
| H04W 24/10 | (2009.01) | |
| H04W 48/06 | (2009.01) | |
| H04W 74/00 | (2009.01) | |
| H04W 72/04 | (2009.01) | |
| H04W 48/08 | (2009.01) | |
| H04W 48/18 | (2009.01) | |
| H04W 28/02 | (2009.01) | |
| H04W 48/12 | (2009.01) | |
| H04W 36/00 | (2009.01) | |
| H04W 4/02 | (2018.01) | |
| H04W 8/00 | (2009.01) | |
| H04W 52/34 | (2009.01) | |
| H04W 56/00 | (2009.01) | |
| H04B 17/318 | (2015.01) | |
| H04W 74/08 | (2009.01) | |
| H04W 72/08 | (2009.01) | |
| H04W 8/06 | (2009.01) | |
| H04W 8/18 | (2009.01) | |
| H04W 60/02 | (2009.01) | |
| H04J 3/16 | (2006.01) | |
| H04L 5/00 | (2006.01) | |
| H04W 28/08 | (2009.01) | |
| H04W 4/60 | (2018.01) | |
| H04W 76/14 | (2018.01) | |
| H04W 4/80 | (2018.01) | |
| H04W 60/00 | (2009.01) | |
| H04W 92/20 | (2009.01) | |
| H04W 84/12 | (2009.01) | |
| H04W 88/08 | (2009.01) | |
| H04W 88/02 | (2009.01) | |
| H04W 88/16 | (2009.01) | |
| H04B 7/0413 | (2017.01) | |
| H04W 8/04 | (2009.01) | |
| H04W 88/18 | (2009.01) | |

(52) U.S. Cl.
CPC ............ *H04L 5/0007* (2013.01); *H04W 4/02* (2013.01); *H04W 4/023* (2013.01); *H04W 4/60* (2018.02); *H04W 4/80* (2018.02); *H04W 8/005* (2013.01); *H04W 8/06* (2013.01); *H04W 8/183* (2013.01); *H04W 24/10* (2013.01); *H04W 28/0215* (2013.01); *H04W 28/08* (2013.01); *H04W 36/0055* (2013.01); *H04W 48/06* (2013.01); *H04W 48/08* (2013.01); *H04W 48/12* (2013.01); *H04W 48/18* (2013.01); *H04W 52/346* (2013.01); *H04W 56/001* (2013.01); *H04W 56/002* (2013.01); *H04W 60/00* (2013.01); *H04W 60/02* (2013.01); *H04W 72/048* (2013.01); *H04W 72/0453* (2013.01); *H04W 72/0486* (2013.01); *H04W 72/085* (2013.01); *H04W 74/004* (2013.01); *H04W 74/0833* (2013.01); *H04W 76/10* (2018.02); *H04W 76/14* (2018.02); *H04W 76/15* (2018.02); *H04W 76/18* (2018.02); *H04W 76/19* (2018.02); *H04B 7/0413* (2013.01); *H04L 5/001* (2013.01); *H04L 5/0098* (2013.01); *H04W 8/04* (2013.01); *H04W 84/12* (2013.01); *H04W 88/02* (2013.01); *H04W 88/08* (2013.01); *H04W 88/16* (2013.01); *H04W 88/18* (2013.01); *H04W 92/20* (2013.01); *Y02D 70/126* (2018.01)

(56) References Cited

OTHER PUBLICATIONS

Samsung; "Resource selection for D2D communication," 3GPP TSG RAN WG2 Meeting #83bis; R2-133327; Ljubljana, Slovenia, Oct. 7-11, 2013; Agenda item 7.5.2.2; 5 pages.

Intel Corporation; "On Resource Allocation and System Operation for D2D Discovery," 3GPP TSG RAN WG1 Meeting #74bis; R1-134141; Guangzhou, China, Oct. 7-11, 2013; Agenda item 7.2.8.2.2; 10 pages.

3GPP TR 36.843 V0.1.0 (Apr. 2013); "Technical Specification Group RAN; Study on LTE Device to Device Proximity services; (Release 12)," 8 pages.

European Patent Office; Extended European Search Report dated May 8, 2017 for Patent Application No. 14858306.5; 10 pages.

Phond Phunchongharn et al.; "Resource Allocation for Device-to-Device Communications Underlaying LTE-Advanced Networks," IEEE Wireless Communications; Aug. 2013; 10 pages.

\* cited by examiner

RESOURCE SELECTION IN DEVICE TO DEVICE COMMUNICATION

CROSS REFERENCE TO RELATED APPLICATIONS

The present application is a national phase entry under 35 U.S.C. § 371 of International Application No. PCT/US2014/057896, filed 26 Sep. 2014, entitled "RESOURCE SELECTION IN DEVICE TO DEVICE COMMUNICATION", which claims priority to U.S. Provisional Patent Application No. 61/898,425, filed 31 Oct. 2013, entitled "ADVANCED WIRELESS COMMUNICATION SYSTEMS AND TECHNIQUES," the entire disclosures of which are hereby incorporated by reference in their entireties.

TECHNICAL FIELD

Embodiments described herein generally relate to the field of communications, and more particularly, to device-to-device (D2D) or peer-to-peer communication in wireless communication networks.

BACKGROUND

It is known in wireless communication systems to provide data communication services such as Internet access and local services through license exempt radio resource bandwidths using wireless local-area network (WLAN) technologies such as Wi-Fi and Wi-Fi Direct, which are based on Institute of Electrical and Electronics Engineers (IEEE) 802.11 standards or using wireless personal area network (WPAN) technologies such as Bluetooth and Ultra Wideband technologies. WLAN and WPAN technologies allow for higher data rates and lower energy consumption by exploiting short distances between a transmitter and receiver. However, Wi-Fi and Bluetooth are susceptible to sources interference from other communications in the unlicensed band and there is no network-based interference management available for these technologies. In the third generation partnership project (3GPP) long term evolution (LTE) and LTE-Advanced (LTE-A) licensed radio band, femtocells, picocells and relays also make use of short distances between transmitter and receiver to perform efficient communication with user equipments (UEs), but these systems require that the data communications pass through the picocell/femtocell base station or relay rather than passing directly between transmitting and receiving UEs and they also require a backhaul connection to an LTE or LTE-A eNodeB of a wireless cellular system.

D2D communications utilizing the LTE/LTE-A spectrum offer the possibility of extending the maximum transmission distance (possibly up to around 1000 m) relative to technologies such as Bluetooth (10-100 m approximate range) and Wi-Fi direct (200 m approximate range) and can reduce the costs and scalability problems potentially associated with the backhaul connection required for picocell/femtocell/relay infrastructure-based networks. D2D communications according to the present technique may also comprise Peer-to-Peer (P2P) communications involving direct communication between network entities or wireless equipments at the same hierarchical level of the wireless network, for example direct communications between picocells, femtocells and relays as well as direct communications between wireless devices such as UEs. A wireless equipment includes at least a UE, a picocell, a femtocell and a relay node.

D2D/P2P communications allow offloading of some network traffic, but there is a need to carefully manage interference arising from the D2D layer to protect both cellular and D2D communication links from in-band emission interference. In-band emission interference corresponds to leakage in a given transmitter within the channel bandwidth, and the resulting leakage can interfere with other transmitters. Out-of-band interference originates from a neighboring transmitter configured to transmit in a different frequency bandwidth, but which still produces energy in the frequency bandwidth of the given transmitter. In-band emission, which can give rise to in-band emission interference can degrade performance of D2D communications, so there is a requirement to control in-band emission.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF EMBODIMENTS

Illustrative embodiments of the present disclosure include, but are not limited to, methods, systems and apparatuses for performing wireless device-to-device communication.

Figure 1:
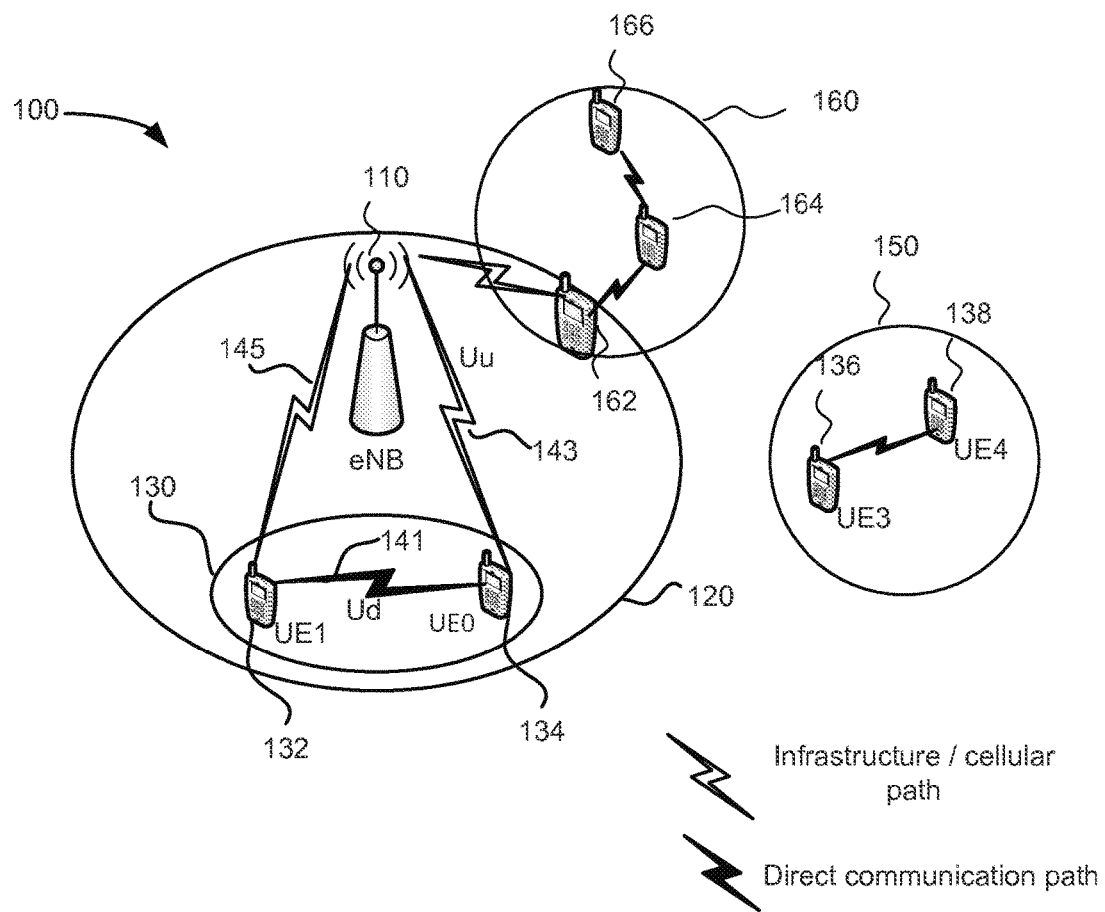
FIG. 1 schematically illustrates a wireless communication network implementing D2D/P2P communication.

FIG. 1 schematically illustrates a wireless communication network 100 implementing D2D/P2P communication both in and out of cellular wireless network coverage from a cellular network such as an LTE or LTE-A network. The network 100 comprises a node 110 and UEs 132, 134, 136, 138. In a 3GPP radio access network (RAN) LTE and LTE-A systems, the node 110 can be an Evolved Universal Terrestrial Radio Access Network (E-UTRAN) Node B (also commonly denoted as an evolved Node B, enhanced Node B, eNodeB, or eNB) or a combination of a node and one or more Radio Network Controllers (RNCs). The node/eNB 110 communicates with one or more wireless device, known as a user equipment (UE). Examples of a UE include a mobile terminal, a tablet computer, a personal digital assistant (PDA) and a machine-type communication (MTC) device. The downlink (DL) transmission can be a communication from the node (or eNB) to the wireless device (or UE), and the uplink (UL) transmission can be a communication from the wireless device to the node.

A first D2D cluster 130 comprises a first UE 132 and a second UE 134, which are each within network coverage because they are both located in a cell 120 associated with the eNB 110. A cluster may include more than two UEs. A direct communication path 141 exists between the first UE 132 and the second UE 134, allowing data to pass between a transmitting UE and a receiving UE without being routed via the eNB 110. However, in this embodiment, control of the D2D data path, Ud, 141 is performed via the eNB 110 using cellular communication paths 143 and 145. Thus data passes directly between the transmitting and receiving UEs 132, 134 whereas control of the D2D link is performed via the eNB 110. The eNB 110 performs setup control, radio bearer control and resource control of the D2D data path 141. In the embodiment of FIG. 1, both UEs 132, 134 of the first D2D cluster 130 are in direct communication with the eNB 110.

The D2D cluster 130 corresponds to an in-coverage D2D communication scenario, where at least one UE 132, 134 has connectivity to the wireless cellular infrastructure via the eNB 110 for control of the D2D communications. For the in-coverage D2D cluster 130, cellular spectrum (e.g. LTE or LTE-A spectrum) can be used for both the D2D path 141 and the cellular links 143, 145. In some embodiments communication may be configured in "underlay" mode, where D2D links and cellular links dynamically share the same radio resources and in other embodiments in "overlay" mode may be used, where D2D communication links are allocated dedicated cellular wireless resources.

A second D2D cluster 150 comprising a third UE 136 and a fourth UE 138 corresponds to an out-of-coverage D2D cluster, in which neither of the UEs 136, 138 is able to form a connection with an eNB of the wireless cellular infrastructure. In this out-of-coverage D2D communication cluster 150, the UEs themselves should be configured to perform peer discovery, resource allocation interference management and power control without network support.

A third D2D cluster 160 in FIG. 1 comprises a cluster-head UE 162, which is in direct communication with the eNB 110 and two further UEs 164, 166 that do not have a direct cellular communication link to the eNB 110. In the third D2D cluster 160 of FIG. 1, the cluster head UE 162 coordinates D2D communications between the other UEs 164, 166 of the cluster and this allows control functions such as radio resource allocation for transmissions from UE 164 and UE 166 to be coordinated by the eNB via the cluster head UE 162.

In the first D2D cluster 120, which is in-coverage, the two UEs 132, 134 of the cluster pair may have radio resources for their respective D2D transmissions allocated by the eNB 110 and they may also achieve frequency synchronization as well as sub-frame, slot and symbol synchronization in the time domain via the eNB. Similarly, the third D2D cluster 160 may achieve timing and frequency synchronization via the cluster head UE 162. The out-of coverage UEs 136, 138 of the second cluster 150 will have to achieve frequency and timing synchronization in some other way. However, for the purposes of the present technique, it is assumed that all active UEs have established timing and frequency synchronization and a communicating UE acquires timing bounds of synchronization, control channels, data channels and other physical channels. The present technique relates to radio resource allocation for D2D communication, which takes into account, via measurements made at the UE, the potential impact of in-band interference on radio resources available for allocation to a particular D2D transmission such as a Voice over Internet Protocol (VoIP) voice call.

Performing D2D communications, as shown in FIG. 1, allows for reuse of radio resources between D2D communications and cellular communications. The D2D communication link 141 uses a single hop between UEs 132, 134, unlike a cellular link between the UEs 132, 134 that would require a two-hop link (the first hop being from the transmitting UE to the eNB and the second hop being from the eNB to the receiving UE) for data transfer via the eNB 110. There is a proximity gain due to the close proximity between UEs 132, 134 with potentially favorable propagation conditions allowing for higher peak data rates than might be achieved when data is routed via the more distant eNB 110. Latency can also improve by implementing a D2D link rather than a cellular link between the UEs 132, 134, because processing performed by the eNB is effectively bypassed.

Setting up D2D communication may be considered to include two stages: firstly proximity discovery, and secondly, initialization and initiation of the D2D communication. Proximity discovery may be achieved, for example, based on positioning information using e.g., Global Positioning Satellite (GPS) or Assisted-GPS information. The second stage includes allocation of network resources (e.g. bandwidth) to the D2D communication.

Most D2D schemes can be classified as belonging to one of two types, termed normal (commercial) D2D and public safety D2D. Some devices may be arranged to operate according to both schemes, while other devices may be arranged to operate according to only one of these schemes. The present technique is applicable to both commercial and public safety D2D communications and to D2D communications both where the communicating UEs are in-coverage and out-of-coverage of the wireless cellular network. The present technique is also applicable to cluster-head configuration where not all UEs of the cluster need be in-coverage.

In a given geographical area there may be several transmitters that may want to transmit the VoIP traffic. In order to allow distant receivers to be reached by transmitted signals, each transmitter may have to transmit VoIP packets in a narrow part of the spectrum (i.e. several Physical Resource Blocks (PRBs)) over multiple sub-frames in order to accumulate energy per information bit and to reach a signal quality metric, such as, for example, a 2% Block Error Rate (BLER) at 135 dB maximum coupling loss. Analysis has shown that transmission over two to three PRBs and at least four Transmission Time Intervals (TTIs) may be appropriate to achieve a target maximum coupling loss. In LTE, one TTI typically corresponds to one millisecond (ms), which is one subframe or two timeslots of a 10 ms radio frame. However, a TTI according to some embodiments may have a different duration in time. LTE resources are allocated on a per-TTI basis.

However, a wireless network can configure any number of frequency and time resources within the LTE physical structure.

In-band and out-of-band interference arise as a result of transmitter imperfections. Out-of-band (or adjacent channel) interference can be controlled by a spectral shaping filter. However, the shaping filter cannot control in-band interference corresponding to leakage in a given transmitter within the channel bandwidth, and the resulting leakage can interfere with other transmitters. The effects of in-band interference are likely to be more pronounced when a resource block allocation size associated with a communication link is small, and when the interfering signal is received at a higher power spectral density.

For D2D broadcast communication it has been shown that in-band emission is likely to be the most limiting factor that degrades performance of simultaneous reception of multiple data transmissions multiplexed in the frequency domain.

Figure 2A:
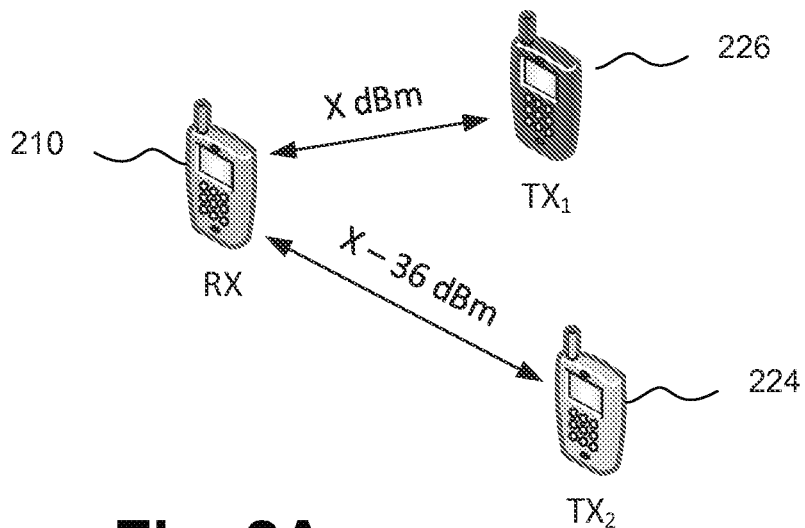
FIG. 2A schematically illustrates a UE simultaneously receiving frequency separated signals from two transmitters with different power levels.

For example, as shown in FIG. 2A, a UE 210 may simultaneously receive frequency separated signals from two transmitters 224 and 226 with different power levels due to different propagation conditions. If the receive power-level difference is significant (e.g. −36 decibel milliwatts (dBm) or larger) then the receiving UE 210 will be able to successfully receive only the strongest signal because the in-band emission from the stronger transmitting UE 224 is comparable or even higher than the useful signal power from the weaker transmitter 226. A receiving UE 210 is likely to be in receipt of signals having a significant power discrepancy between them when those signals are being transmitted from UEs having partially overlapping transmission ranges, where the receiving UE is located in the region of the overlap and on the periphery of one but not the other of the two transmission ranges.

Figure 2B:
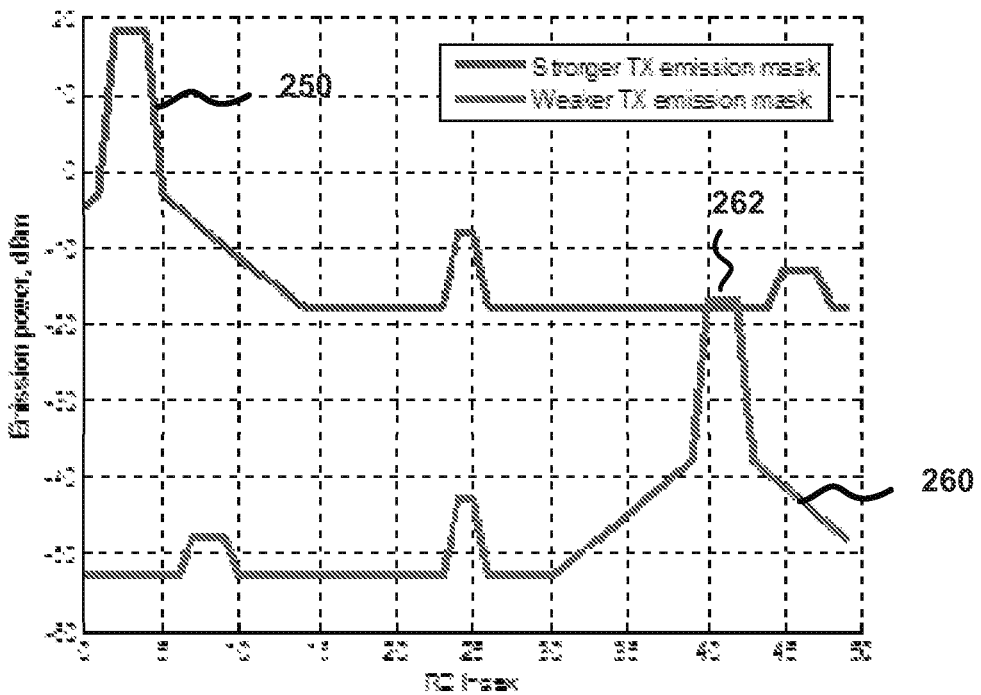
FIG. 2B is a graph of signal emission power against a resource block index for a radio frame.

FIG. 2B is a graph of signal emission power in dBm against a resource block index (RB index). The resource block index provides an indication of frequency, with each resource block corresponding to 180 kHz bandwidth in LTE. The graph shows a stronger emission mask 250 corresponding to the closest transmitter 224 in FIG. 2A and a weaker emission mask 260, corresponding to the more distant transmitter 226 in FIG. 2A. It can be seen that although the emission power for the stronger signal 250, peaks within RB index 0-5 whilst the weaker signal peaks within RB index 40-45, the difference in the emission power is such that the in-band emission of the stronger signal 250 is of comparable strength to the peak emission strength of the weaker signal at point 262. Thus the receiver 210, will not be able to detect the weaker signal 260.

In previously-known communication systems the in-band emission problem is minimized (or at least reduced) by using a centralized power control mechanism (e.g. uplink power control in LTE) or full time division multiplexing (e.g. Wi-Fi). However, for D2D broadcast communication these solutions are inapplicable for the following reasons:
  Power control cannot be used because the target receivers are unknown at the transmitter side; any
  Pure time-division multiplexing cannot be easily realized due to constraints in available time resources.

One possible way to address control of in-band emission interference in D2D communications is to randomize interference. Another way to address in-band emission interference in D2D communications is to assist in the selection of the radio resource in an attempt to minimize (or at least reduce) the interference. According to embodiments, the in-band emission interference is autonomously resolved at the UE side by applying special resource selection rules based upon received signal characteristics obtained by measurement and/or decoding received signals for other transmitters.

Figure 3:
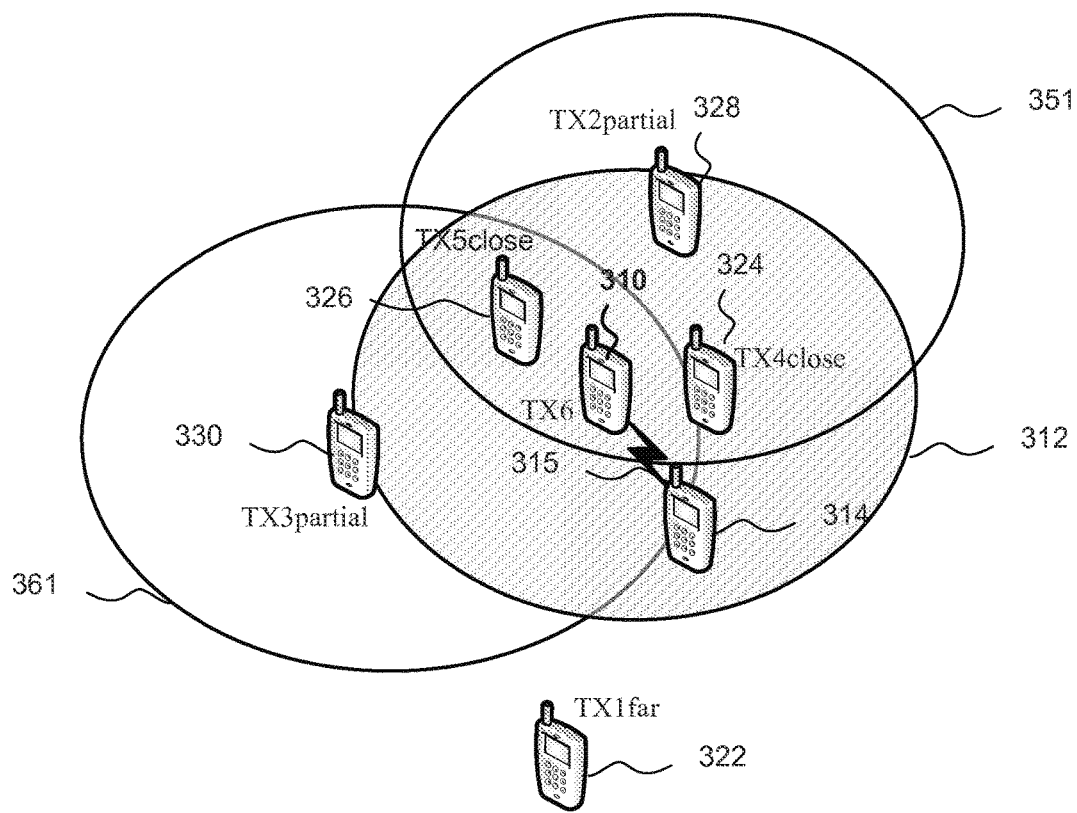
FIG. 3 schematically illustrates a plurality of D2D-enabled UEs and associated transmission ranges.

FIG. 3 schematically illustrates a plurality of D2D-enabled UEs and some associated transmission ranges. Consider allocating radio resources for a UE 310 (TX6) having a transmission range 312. The UE 310 (TX6) requests to perform a broadcast to other UEs in the vicinity, for example, a UE 314 via a D2D connection 315. Prior to the D2D connection 315 being established, there are a number of UEs in the vicinity of UE 310 (TX6) currently transmitting using D2D resource units (typically comprising a plurality of physical resource blocks) within a frequency bandwidth, for example a frequency bandwidth corresponding to a physical uplink shared channel (PUSCH). However, any DL or UL channel or even unlicensed spectrum may be allocated as D2D resource units. The other UEs currently transmitting as shown in FIG. 3 comprise: a UE 324 (TX4close); a UE 326 (TX5close); a UE 328 (TX2partial); and a UE 330 (TX3partial). The UEs 324, 326 are located very close to the given UE 310 (TX6) and thus a D2D transmission by UE 310 is likely to be of similar signal strength to transmissions of UEs 324, 326 (TX4close and TX5close). The UE 322 (TX1far) is located far from the given UE 310 (TX6) and has a non-overlapping or barely overlapping transmission range with the transmission range of TX6.

Figure 6:
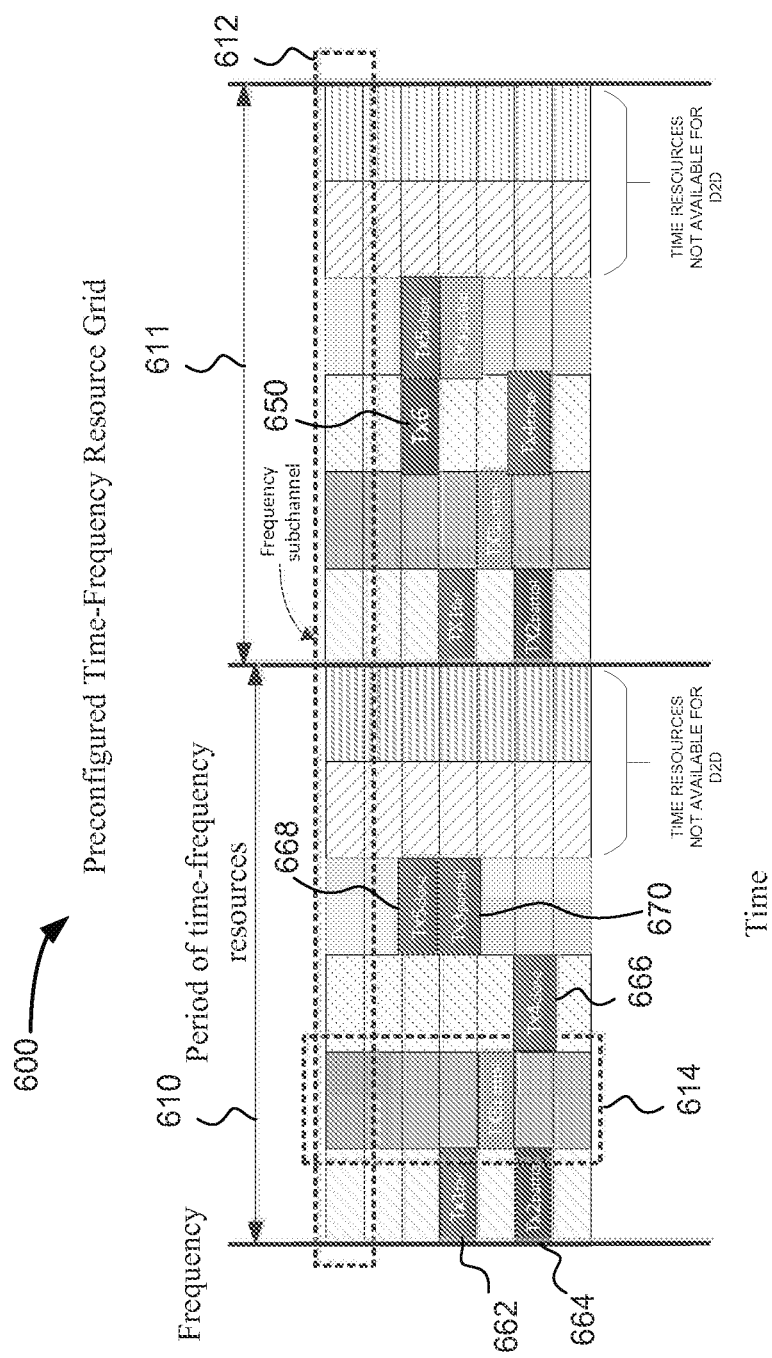
FIG. 6 schematically illustrates a pre-configured time-frequency resource grid used for UE-based resource allocation.

As shown in FIG. 3, the UE 328 (TX2partial) has a transmission range 351, that partially overlaps the transmission range 312 of the given UE 310 (TX6). Similarly, the UE 330 (TX3partial) has a transmission range 361 that partially overlaps the transmission range of the UE 310 (TX6). Thus to reduce the likelihood of in-band emission interference for the D2D connection 315, resources should be allocated to UE 310 (TX6) avoiding substantially simultaneous transmission with either UE 328 (TX2partial) or UE 330 (TX2partial). An actual time resource allocation to UE 310 (TX6) is illustrated by FIG. 6 and is described below.

The following observations can be made assuming simultaneous transmissions on orthogonal (distinct) frequency resources:
  In the case of non-overlapping transmission areas, transmitters have disjoint sets of associated receivers. Receivers can successfully receive data from corresponding transmitters within a respective transmission range without interference from the other transmitter.
  In case of fully overlapping transmission areas, transmitters have almost the same set of associated receivers. Due to proximity of the transmitters to the UEs in the transmission range, there may be no significant de-sensing problems and a majority of associated receivers within the transmission range may successfully receive data from both transmitters. De-sensing is the effect of a strong signal from a transmitter on the detection of a weak signal by a receiver.
  In case of partially overlapping areas as illustrated in FIG. 3, there may be UEs interested in reception from both transmitters (transmitters 310 and 328 or transmitters 310 and 330) but are able to receive a signal only from one transmitter because of in-band emission and de-sensing problems.

Accordingly, when two substantially simultaneous D2D transmissions originate from UEs that are either sufficiently distant that their transmission ranges do not overlap or are sufficiently close that their transmission ranges fully or almost fully overlap, in-band emission interference effects are not likely to be problematical when the two transmitters are transmitting in the same time resource. However, for partially overlapping transmission ranges where transmitters are using orthogonal frequency resources but the same time resources, in-band emission interference can interfere with signal reception.

Accordingly, a mechanism is proposed to effectively manage in-band emission interference by selecting time radio resources (predetermined time units) for transmission such that other transmitters currently utilizing the same time resource are either sufficiently close to the given transmitter for which the time resource is being selected or sufficiently far from the given transmitter that in-band emission interference is not likely to be problematical.

Figure 4:
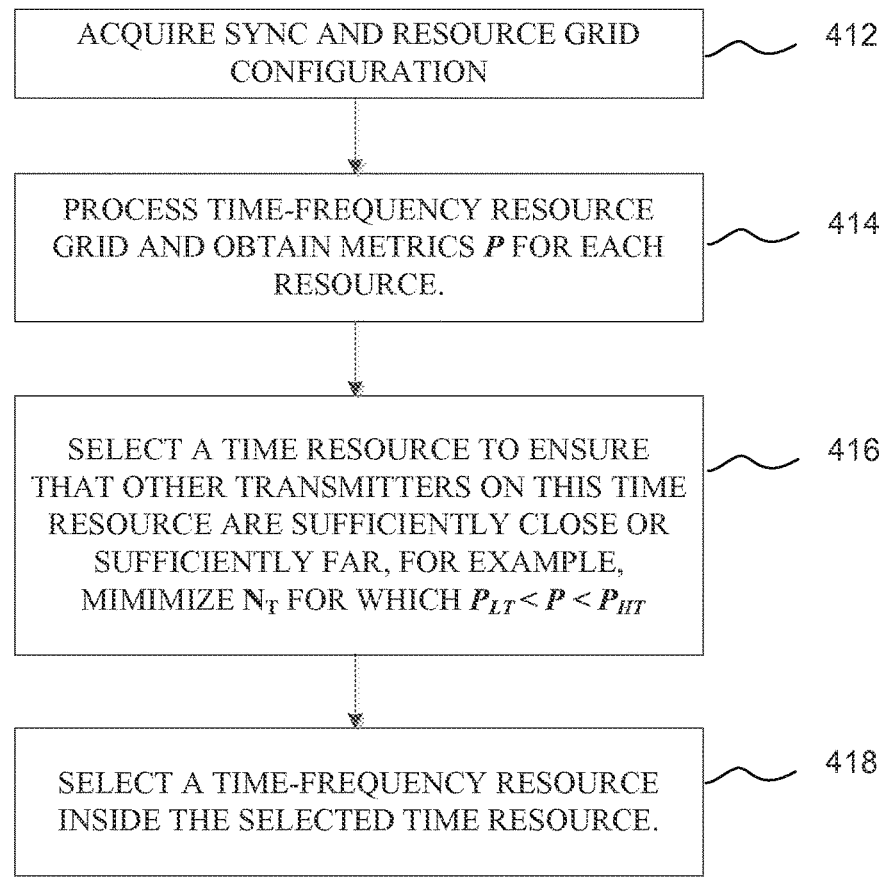
FIG. 4 is a flow chart schematically illustrating principles underlying a radio resource allocation process performed by a D2D-enabled UE.

FIG. 4A is a flow chart schematically illustrating a radio resource allocation process performed by a D2D-enabled UE according to embodiments. The process begins at process element 412, where the UE acquires frequency synchronization and radio resource grid (or resource structure) configuration, either via an eNB or by an alternative mechanism. At process element 414, the acquired time-frequency resource grid is evaluated by the UE to obtain the value of at least one signal metric (or characteristic or measurement) for at least a subset of the time-frequency resource units of the resource grid acquired at process element 412. A single resource unit may comprise one or a plurality of LTE physical resource blocks (see FIGS. 6 and 7), the number depending upon the frequency bandwidth of the communication channel and the particular configuration of the resource grid. The signal metric may be a power measurement. Alternatively, the signal metric may be a received signal quality measured, for example, such as a Signal to Interference plus Noise Ratio (SINR) or the signal metric may be a received signal strength and may be based upon a signal amplitude and/or phase measured by an antenna or calculated via processing in the receiver. The signal metric may comprise a combination of different signal parameters such as signal power, signal strength and signal quality. The signal metric may be calculated for each and every time-frequency resource unit (for example a group of LTE physical resource blocks), including those already currently allocated to other active transmitters or may be calculated for only a subset of time-frequency resource units, with some resource units being designated (e.g. via pre-configuration of the UE) as not available for allocation to a transmission being scheduled. The signal metric may be measured directly via one or more antenna(s) of the UE or may be evaluated by decoding the received signals.

Process element 416 involves selecting a time resource of the resource grid using the signal metric. The signal metric may be processed in a number of alternative ways with a view to selecting a time resource (periodic time unit such as a subframe) that reduces the likelihood of selecting a time resource having frequency sub-channels currently allocated to active transmitters partially overlapping the transmission area of the UE for which the resource allocation is being performed. For example one or more power thresholds may be applied to the signal metrics for a plurality of frequency sub-channels of each time resource. Where time resources of the grid are at least partially occupied by transmitters an upper power threshold may be used to select the time resource having the greatest number of physical resource blocks above a threshold power. This effect of this should be to group substantially simultaneously transmissions in a small geographical area because the high power transmissions should correspond to transmitters closely located to the transmitter for which the resource allocation is being performed (i.e. the UE performing the resource allocation calculation).

Alternatively, a lower power threshold PLT may be applied to identify distant transmitters and an upper power threshold PHT may be defined to identify close transmitters having substantially overlapping transmission ranges with the UE for which resource allocation is being performed. By counting the number of resource units in a given time resource having an associated power (or other signal metric parameter) between the two thresholds PLT and PHT, the timeslot(s) having the greatest number of partially overlapping transmitters can be identified. A timeslot that minimizes the number $N_T$ of constituent resource units for which PLT<P<PHT, where P is the measured power of a single resource unit, may be selected for allocation to the given transmitter. The signal metric may be accumulated over a plurality of physical resource blocks corresponding to an allocation "resource unit". Minimizing the number of constituent resource units in this way is equivalent to maximizing the number of resource units in the timeslot that are any one of unused, occupied by very close transmitters or occupied by very distant transmitters.

At process element 418, a frequency resource (e.g. a frequency sub-channel spanning say 1 Mhz) within the time resource identified in process element 416 is selected for resource allocation in a corresponding transmission time interval of a subsequent resource grid period (e.g. a radio frame). The frequency resource may be selected either randomly or based upon the same or a different signal metric used to select the most suitable time resource. For example, the frequency sub-channel having minimum received energy may be selected.

Figure 5A:
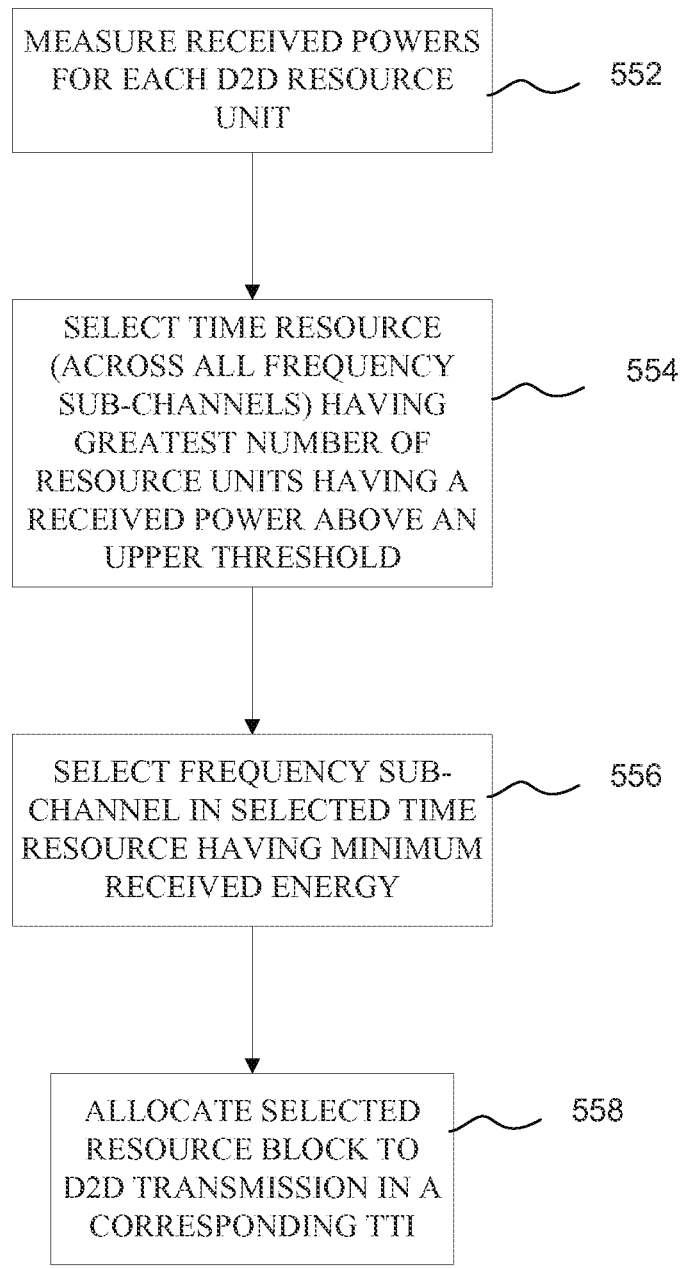
FIG. 5A is a flow chart schematically illustrating at a high level of abstraction how time-frequency resource allocation is performed in a UE.

FIG. 5A is a flow chart schematically illustrating at a high level how time-frequency resource allocation is performed in a UE according to the present technique.

Firstly, it is assumed that timing and frequency synchronization of all active UE nodes is established with required accuracy across a sufficiently large geographical area. The communicating UE acquires timing bounds of synchronization, control, data and other physical channels and is enabled to perform D2D communication.

Since the D2D-enabled UE has already acquired the position of a D2D data channel (for example the D2D equivalent of a Physical Downlink Shared Channel (PDSCH) LTE/LTE-A channel) it can measure received signal power from each time-frequency data resource unit of the already configured periodic resource grid structure in a D2D data region. After the measurements it applies a selection rule based on analysis of received powers (or alternative signal metric) at all time-frequency resources. A time-frequency resource unit as described herein may, for example, correspond to a group of 7*2 LTE physical resource blocks, but is not limited to this.

According to the present technique, it is proposed to select the time-frequency resource for transmission according to the following rules:

At process element 452 in FIG. 5A, the received power is measured for each D2D time-frequency resource unit. This may be performed by simply measuring the energy on receiving antennas of the UEs in the relevant frequency channels and time slots of the resource grid. Performing the measurement using the receiving antennas gives the sum of signal energies from all signals sources: co-channel transmitters with known reference signals; co-channel transmitters with unknown reference signals; in-band emission from non-co-channel transmissions; and any other signal sources. In some embodiments LTE reference signals are used to distinguish between signals sources whose signals are received in the same grid resource unit if the reference signals are known. However, reference signals may not be known for some D2D communications.

At process element 554 a time resource (or time unit) where the received power from the maximum number of active transmitters exceeds a predefined value of PHT (determined by the number of counting resource units corresponding to the given timeslot having received power above the threshold) is selected to implicitly group simultaneous transmissions in a small geographical area and therefore reduce the power level difference of signals arriving at the receivers (the closer the transmission points to each other the smaller the received power difference from the receiver, RX, perspective).

At process element 556, a frequency sub-channel in the time resource (unit) that was selected at process element 554 is selected by selecting the frequency sub-channel with minimum (or smallest) received energy to minimize (or at least reduce) co-channel collision at interested receivers.

Note, that the implicit grouping principles (implemented via the threshold(s) used on the signal metric for the resource units) are also beneficial for better aligning of arrival timing of substantially simultaneous transmissions.

Figure 5B:
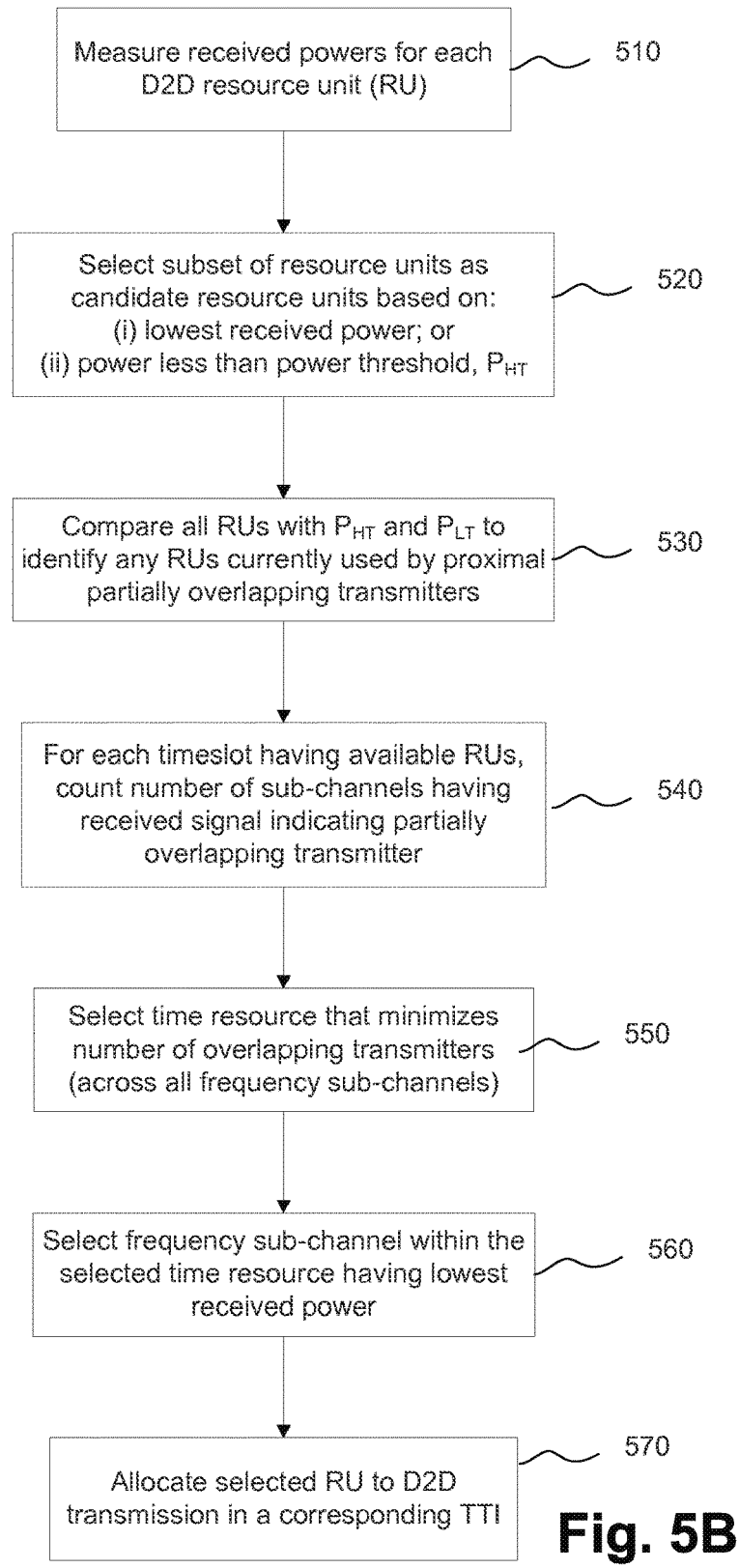
FIG. 5B is a flow chart schematically illustrating at a lower level of abstraction than in FIG. 4B how time-frequency resource allocation is performed in a UE.

The above principles are applied in the autonomous resource selection algorithm described in more detail by the flow chart of FIG. 5B. FIG. 5B is a flow chart schematically illustrating at a lower level of abstraction than in FIG. 5A how time-frequency resource allocation is performed according to the present technique.

Process element 510: Measure received powers (or pathgains to the strongest UE transmitting in the current resources) from all resource units in the D2D data region of the allocated D2D spectrum, so that a received power map is created over all transmission opportunities in the D2D region of the resource grid. The received power is one example of a signal metric. In some embodiments D2D communications may be allocated a subset of the LTE UL spectrum, but embodiments are in no way limited to this. In the D2D spectrum there are data, synchronization, discovery and other subchannels or regions.

Process element 520: Process the measured received power map of the D2D data region and select a subset of candidate resources CR (transmission opportunities) from the full set of time-frequency resource units of the resource grid (resource structure) according to at least one of the options:
Option 1: Select the fixed number |CR| of resources with lowest received power.
Option 2: Select all resources with received power less than a predefined threshold.

This subset selection looks for non-occupied frequency sub-channels that can exclude time resources of the grid already fully occupied by other transmitters, because they are not suitable for allocation as a radio resource for the current transmitter.

Process element 530: Compare the received power (values of signal metric for the corresponding resource unit) from each transmission opportunity/resource unit of the D2D data region with two power thresholds PLT and PHT. The threshold PHT is used to determine the transmitters that are in proximity (closely located) and the threshold PLT is used to calculate the number of transmitters that are sufficiently distant from the given device.

Process element 540: Count the number, $N_T$, of resource units with received power/pathgain of PLT<P<PHT (i.e. the number of strong interferers which are not sufficiently far or close) at each available time slot in the D2D data region of the radio resources.

Process element 550: select the time resource (e.g. LTE subframe) that minimizes $N_T$. There may typically be several candidates (corresponding to different frequency sub-channels) within this time resource suitable for allocation to the transmission.

Process element 560: From the subset CR of candidate resource units selected at process element 520, select the time-frequency resource with lowest received power that minimizes $N_T$ (calculated at process element 540) and thus belongs to the time slot selected at process element 550.

Process element 570: allocate the selected time-frequency resource unit in a corresponding transmission time interval. The periodic structure of the time-frequency resource grid allows the UE to assume the same or similar interference conditions on the next time period relative to the measurement period.

Note that power thresholds PLT, PHT can be configured by the eNB 110, configured by the cluster head 162 or even calculated autonomously by the UE. The power thresholds may be dynamically adapted in response to, for example, the signal metric measurements.

Figure 7:
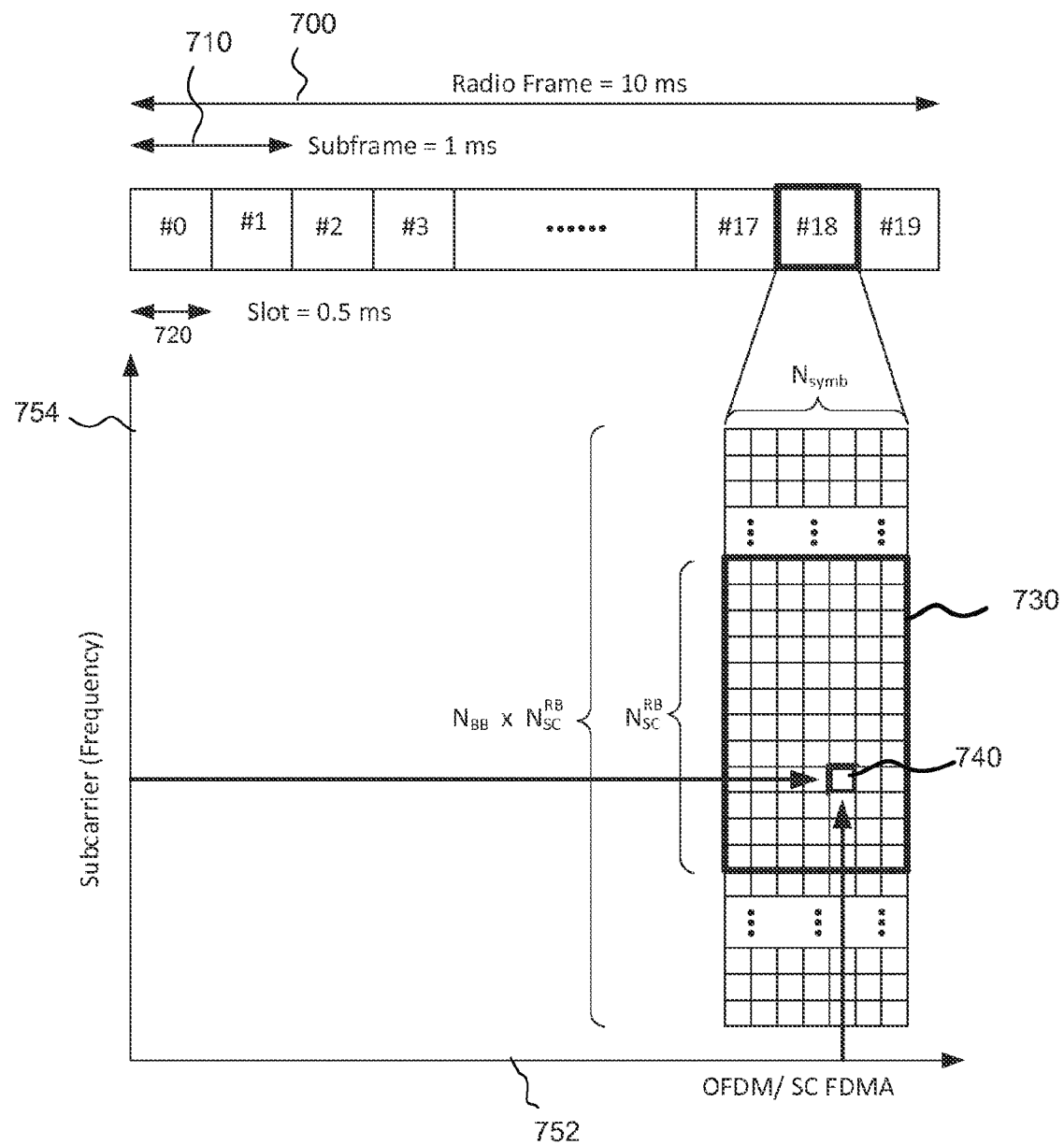
FIG. 7 schematically illustrates a block diagram of radio frame resources corresponding to an uplink or downlink LTE radio frame structure.

FIG. 6 schematically illustrates a pre-configured time-frequency resource grid 600 (or time-frequency resource structure) implementing resource allocation according to an embodiment. The resource grid 600 is repeated with a periodicity of six LTE subframes. The network can configure any number of frequency and time resources within the LTE/LTE-A physical structure. The resource grid/structure comprises a plurality of "resource units" or "resource entities", each unit/entity comprising a group of physical resource blocks. In the example time-frequency resource grid 600 of FIG. 6 there are seven frequency resources and six time resources in one period of the grid/structure. Each frequency resource comprises a plurality (in this case seven) resource units/entities (each unit on the frequency axis comprising seven physical resource blocks) and six time resources of one subframe each. A 10 MHz frequency bandwidth comprises a total of fifty physical resource blocks, so in the FIG. 6 example seven physical resource blocks are allocated to each frequency resource (i.e. to each frequency sub-channel). A typical radio frame structure in LTE, showing the structure of a physical resource block is illustrated in FIG. 7 and described below.

D2D communications may use licensed or unlicensed spectrum and the resource grid can be configured in a number of alternative ways with different numbers of frequency and time resources in the grid, with perhaps only a subset of the resource units being available for allocation to a D2D communication. The resource grid comprises a total of N by M resource units/entities and in this case N=7 and M=6, but N and M are integer values greater than or equal to one. In this case each resource unit comprises seven resource blocks on the frequency axis and two resource blocks on the time axis of the grid. In LTE/LTE-A, the physical resource block is the basic element of radio resource allocation and the minimum Transmission Time Interval (TTI) is typically one millisecond and corresponds to two physical resource blocks. A single frequency sub-channel 612 corresponds to a row of resource units whereas a single time resource corresponds to a column 614 of the resource grid and comprises seven distinct frequency sub-channels in this embodiment. Individual resource units of the first period of the resource grid 600 are labeled according to which of the transmitters of the configuration of UEs illustrated in FIG. 3 occupies those resources. In this example time-frequency resource grid a single "resource unit" corresponds to seven physical resource blocks along the frequency axis and two physical resource blocks along the time axis (one subframe comprises two timeslots) and thus one resource unit comprises a total of fourteen physical resource blocks. A resource unit may comprise one or more physical resource blocks depending upon the particular time-frequency resource grid configuration adopted by the UE.

The resource allocation is performed to allocate time-frequency unit(s) to the transmitter TX6 310 (see FIG. 3). In the resource grid of FIG. 6, the first time resource has a resource unit 662 allocated to the distant transmitter Tx1far 322 and a resource unit 664 allocated to the partially overlapping transmitter Tx3partial 330. The third time resource has a single resource unit 666 allocated to the close transmitter Tx4close 324. The fourth time resource has one resource unit 668 occupied by the close transmitter Tx5close 326 and an adjacent (contiguous) frequency sub-channel 670 occupied by transmitter TX3partial 330. The final two time resources of the period are not available for D2D communication because they have been excluded at process element 520 of FIG. 5B. Any of the remaining unoccupied time-frequency resource units with the exception of those in the last two time resource columns of the resource grid/structure could be allocated to the given UE Tx6 310 in a subsequent TTI or period.

However, according to some embodiments, a time resource is selected so as to minimize (or at least reduce) the number of partially overlapping transmitters currently occupying the same time resource/time unit. Since the first time resource of the grid accommodates Tx2partial 328, the second time resource accommodates Tx3partial 330 and the fourth time resource accommodates Tx3partial 330, these three time resources are not selected for Tx6 310. Instead the third time resource, which accommodates only Tx4close in a resource unit 666 is selected for allocation to Tx6 310. This allocation is based on the evaluation of the signal metric using the upper and lower power thresholds as described above. In the subsequent transmission time interval (period), TX6 310 is allocated a resource unit 650 that is randomly selected from the third of the six time resources of the column of the grid 600.

The first period 610 of the resource grid corresponds to a period in which the signal metric is evaluated and represents the measurement period for the subsequent (contiguous) period 611 when the resource allocation based on the measurement (preceding) period is implemented. The measurement need not be performed in every period, but could be repeated after a given plurality of periods or even repeated only intermittently and utilized for resource allocation in more than one subsequent period, provided that interference conditions allow for this. FIG. 7 schematically illustrates a block diagram of radio frame resources corresponding to an uplink or downlink LTE radio frame structure according to some embodiments. In LTE, downlink communications use OFDMA whereas uplink communications use SC-FDMA. A typical radio frame 700 has a duration of 10 milliseconds and is composed of twenty contiguous 0.5 millisecond slots. A subframe 710 is formed from two adjacent slots and thus has a one millisecond duration. FIG. 7 shows slot #18, which is the penultimate slot of the frame, in more detail. A single resource block 730 can be seen to comprise a number of OFDM/SC-FDMA symbols $N_{symbol}=7$ on a time axis 752 and a plurality of subcarriers $N_{SC}^{RB}=12$ on a frequency axis 754. Each OFDM/SC-FDMA symbol occupies a shorter time duration (six or seven symbols per timeslot) within the 0.5 ms slot 720 of the radio frame 700. The resource block 730 comprises a total of $N_{symbol} \times N_{SC}^{RB}$ constituent resource elements.

A single resource element 740 is characterized by a single subcarrier frequency and a single OFDM/SC-FDMA symbol. In FIG. 7, although only one complete resource block 230 is shown, a plurality of resource blocks $N_{BB}$ are associated with each of the twenty slots of the radio frame 700. The resource block 730 in the FIG. 7 example is mapped to eighty-four resource elements 740 (12 subcarriers times 7 symbols) using short or normal cyclic prefixing. In one alternative arrangement (not shown) the resource block is mapped to seventy-two resource elements (12 subcarriers times 6 symbols) using extended cyclic prefixing. The resource element 740 is the smallest identifiable unit of transmission, but transmissions are actually scheduled in the larger units corresponding to the (physical) resource blocks 730.

Each resource element 740 can transmit a number of bits depending upon the particular type of modulation scheme employed for the channel with which the resource element is associated. For example, where the modulation scheme is quadrature phase-shift keying (QPSK), each resource element 740 can transmit two bits. The resource block 730 can be configured either for downlink transmission from the eNodeB to the UE or for uplink transmission from the UE to the eNodeB.

In LTE DL transmission uses OFDMA whereas UL transmission used SC-FDMA. SC-FDMA differs from OFDMA in that in the SC-FDMA subcarriers are not independently modulated whereas the OFDMA subcarriers are independently modulated. D2D communications can use LTE DL and/or UL resources. Physical resource blocks of the LTE radio frames can be allocated to D2D communications such as voice calls. According to the present technique, a resource unit of FIG. 6 may in some embodiments correspond to a plurality of resource blocks 730 (e.g. fourteen) of FIG. 7.

Figure 8A:
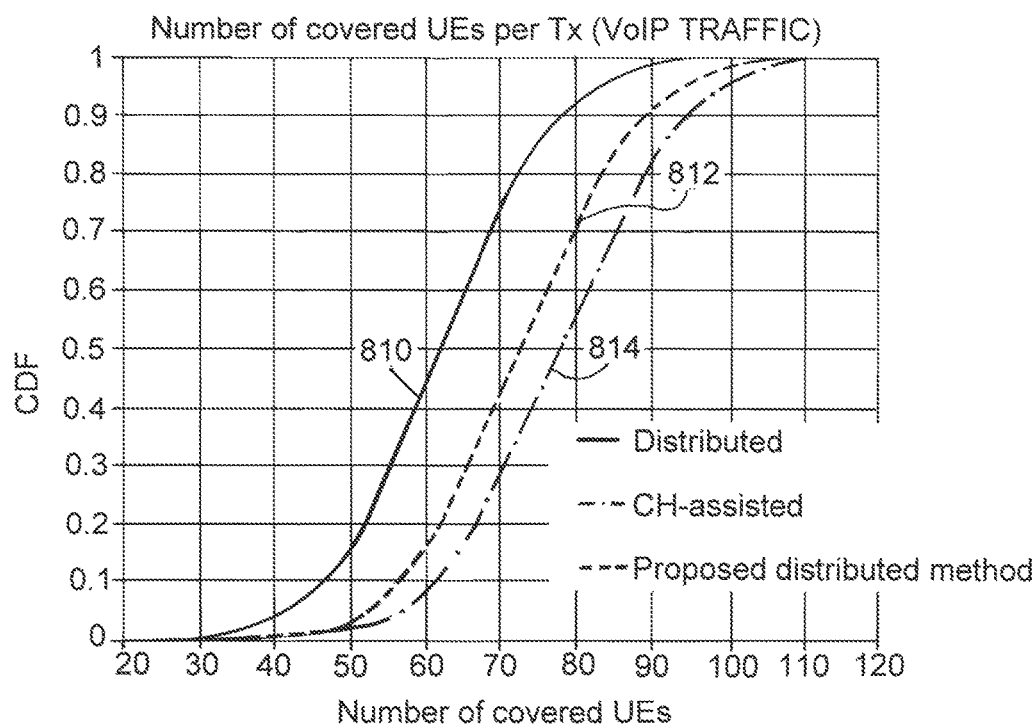
FIG. 8A is a graph showing the Cumulative Distribution Function (CDF) of a number of UEs which successfully receive a traffic stream per broadcast transmitter.
Figure 8B:
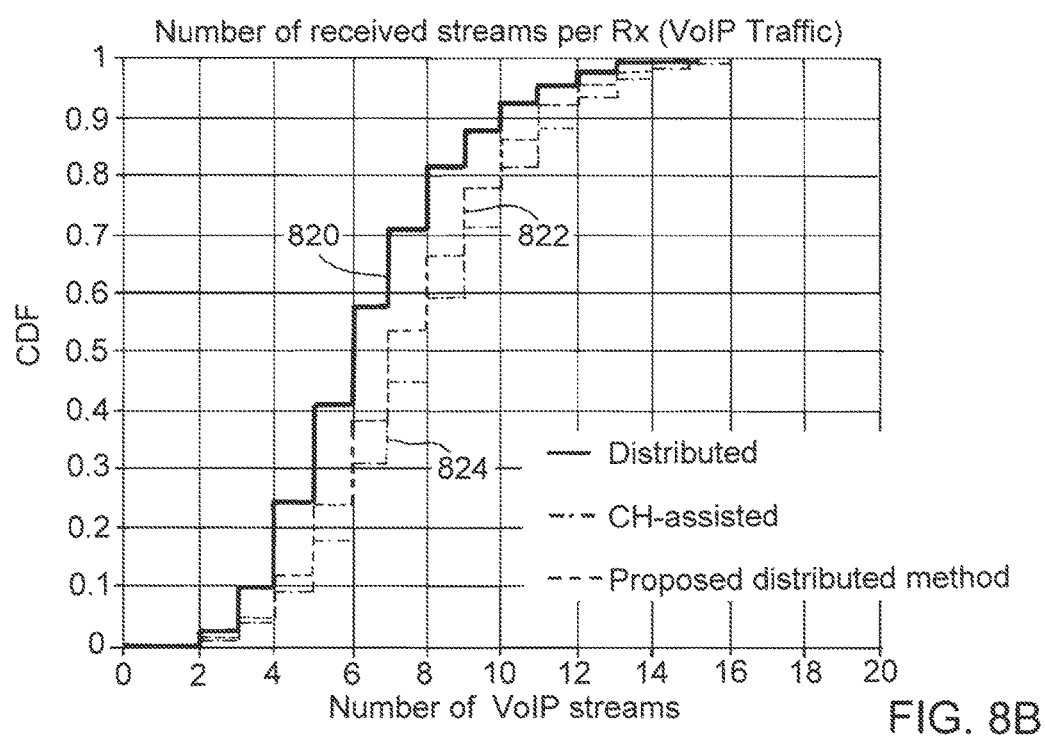
FIG. 8B is a graph showing the CDFs of the number of successfully decoded traffic streams at each receiver.

FIG. 8A is a graph showing the Cumulative Distribution Function (CDF) of the number of UEs that successfully receive a traffic stream (VoIP traffic in this study) per broadcast transmitter. FIG. 8B is a graph showing the CDFs of the number of successfully decoded traffic streams at each receiver.

The resource selection method according to embodiments ("Proposed Distributed Method") is compared with another distributed option for which a first reference curve is denoted "Distributed" in which a frequency resource is selected according to a minimum received power and a time resource is selected according to a random back-off rule. The "Distributed" reference curve in the CDF of FIG. 8A is curve 810 and is the left-most curve on the graph and thus corresponds to the poorest performance. The "Distributed" reference curve in FIG. 8B is curve 820, which again is the left-most curve.

For the "Proposed Distributed method", which is relevant to the embodiments, the power thresholds, PLT and PHT were set to −110 and −40 dBm respectively. The curve for the "Proposed Distributed Method" in FIG. 8A is curve 812 and in FIG. 8B it is curve 822. The curves 812 and 822 lie between the curves on the same graph corresponding to the "Distributed" method (left-most curve) and the CH-assisted method (right-most curve). The second reference curve ("CH-assisted") relates to a resource allocation system where the time resources are selected and indicated by a centralized node such as an eNB and/or a Cluster Head. Based on the results of FIGS. 8A and 8B, the CH-assisted method gives the best performance of the three methods. The described "Distributed" resource selection method is evaluated using the agreed methodology from the 3GPP Rel-12 LTE D2D study item "Draft 3GPP TR 36.843, *Study on LTE Device to Device Proximity Services—Radio Aspects*", 2013".

The performance comparison of the resource allocation system according to the present technique as implemented in some embodiments with the other methods in FIGS. 8A and 8B shows that the "Proposed Distributed method" 812, 822 outperforms the "Distributed" random access scheme 810, 820 and closely approaches the "CH-assisted" one (curves 814, 824). Therefore, embodiments can provide a competitive solution to use to perform resource selection in LTE D2D broadcast communication.

Figure 9:
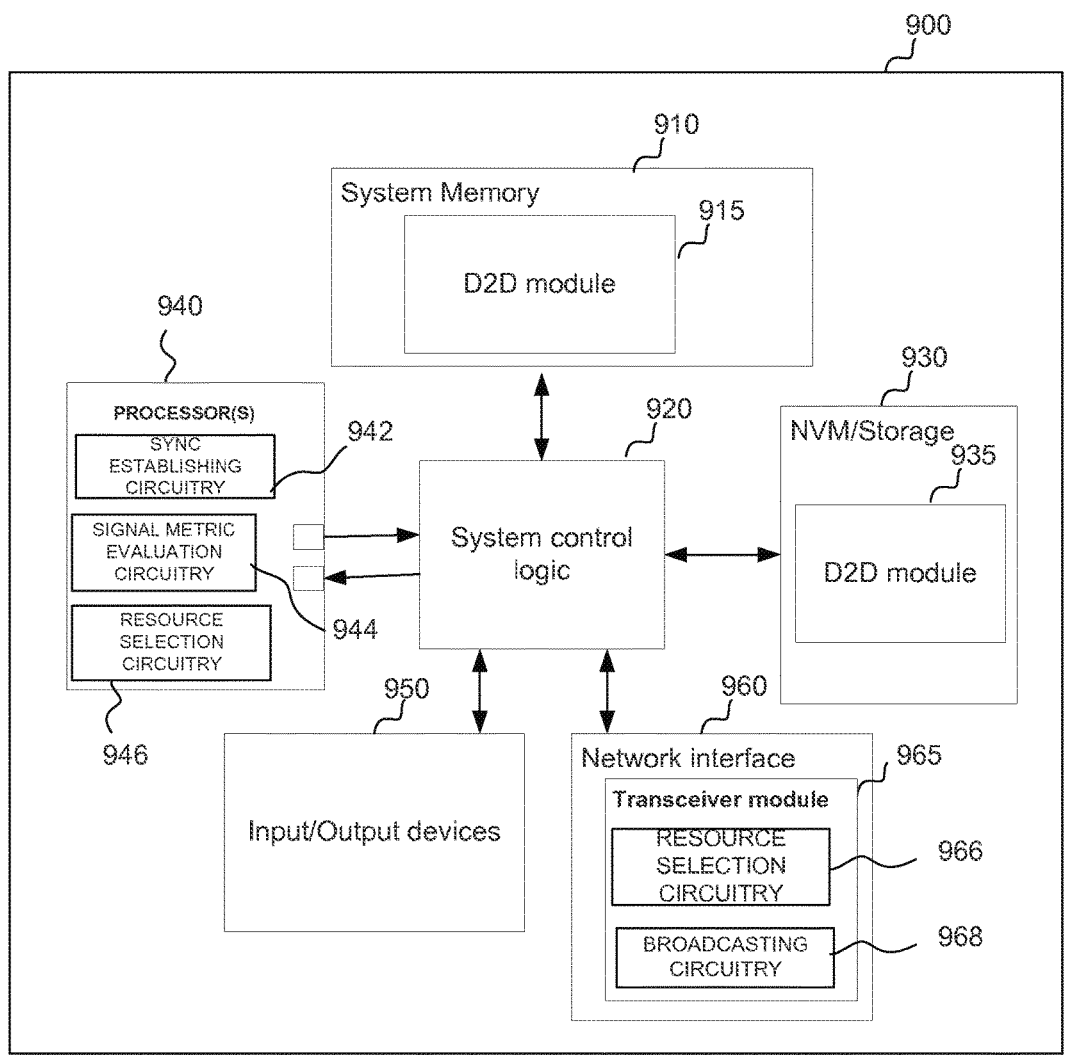
FIG. 9 illustrates an example system according to some embodiments.

FIG. 9 illustrates an example system 900 according to some embodiments. System 900 includes one or more processor(s) 940, system control logic 920 coupled with at least one of the processor(s) 940, system memory 910 coupled with system control logic 920, non-volatile memory (NVM)/storage 930 coupled with system control logic 920, and a network interface 960 coupled with system control logic 920. The system control logic 920 may also be coupled to Input/Output devices 950.

Processor(s) 940 may include one or more single-core or multi-core processors. Processor(s) 940 may include any combination of general-purpose processors and dedicated processors (e.g., graphics processors, application processors, baseband processors, etc.). Processors 940 may be operable to carry out the above described methods, using suitable instructions or programs (i.e. operate via use of processor, or other logic, instructions). The instructions may be stored in system memory 910, as system memory portion (D2D module) 915, or additionally or alternatively may be stored in (NVM)/storage 930, as NVM instruction portion (D2D module) 935. D2D modules 915 and/or 935 may include program instructions to cause a processor 940 to generate a synchronization signal and/or broadcast radio resource information for D2D communications deriving timing from the generated synchronization signal. D2D module 915 and/or 935 may form part of a communication section, including circuitry to cause broadcast of a D2D new synchronization signal having independent timing, a propagated synchronization signal adopting timing from a received synchronization signal and radio resource information recommending radio resources to be used for a D2D communication such as a voice call.

Processors(s) 940 may be configured to execute the embodiments of FIGS. 2-6. The processor(s) may comprise synchronization establishing circuitry 942, signal metric evaluation circuitry 944 for evaluating one or more physical signal characteristic and resource selection circuitry 946 for selecting radio resource units for allocation to a D2D communication channel. A transceiver module 965 comprises resource selection circuitry 966 and broadcasting circuitry 968 for broadcasting a D2D transmission using the radio resource units allocated within the transmitting UE. It will be appreciated that the scanning, synchronization signal generation/broadcast and resource allocation information broadcast functionality may be distributed or allocated in different ways across the system involving one or more of the processor(s) 940, transceiver module 965, system memory 910 and NVM/Storage 930.

System control logic 920 for one embodiment may include any suitable interface controllers to provide for any suitable interface to at least one of the processor(s) 940 and/or to any suitable device or component in communication with system control logic 920.

System control logic 920 for one embodiment may include one or more memory controller(s) to provide an interface to system memory 910. System memory 910 may be used to load and store data and/or instructions, for example, for system 900. System memory 910 for one embodiment may include any suitable volatile memory, such as suitable dynamic random access memory (DRAM), for example.

NVM/storage 930 may include one or more tangible, non-transitory computer-readable media used to store data and/or instructions, for example. NVM/storage 930 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 930 may include a storage resource physically part of a device on which the system 900 is installed or it may be accessible by, but not necessarily a part of, the device. For example, the NVM/storage 930 may be accessed over a network via the network interface 960.

System memory 910 and NVM/storage 930 may respectively include, in particular, temporal and persistent copies of, for example, the instructions portions 915 and 935, respectively. D2D modules 915 and 935 may include instructions that when executed by at least one of the processor(s) 940 result in the system 900 implementing one or more of methods of any embodiment, as described herein. In some embodiments, instructions 915 and 935, or hardware, firmware, and/or software components thereof, may additionally/alternatively be located in the system control logic 920, the network interface 960, and/or the processor(s) 940.

The transceiver module 965 provides a radio interface for system 900 to communicate over one or more network(s) (e.g. wireless communication network) and/or with any other suitable device. The transceiver 965 may perform the various communicating, transmitting and receiving described in the various embodiments, and may include a transmitter section and a receiver section. In various embodiments, the transceiver 965 may be integrated with other components of system 900. For example, the transceiver 965 may include a processor of the processor(s) 940, memory of the system memory 910, and NVM/Storage of NVM/Storage 930. Network interface 960 may include any suitable hardware and/or firmware. Network interface 960 may be operatively coupled to a plurality of antennas to provide a multiple input, multiple output radio interface. Network interface 960 for one embodiment may include, for example, a network adapter, a wireless network adapter, a telephone modem, and/or a wireless modem. For example, where system 900 is an eNB, network interface 960 may include an Ethernet interface, an S1-MME interface and/or an S1-U interface. The system 900 of FIG. 9 may be implemented in a UE, but may alternatively be implemented in a picocell, femtocell or relay node for the purposes of implementing peer-to-peer communication and resource allocation.

For one embodiment, at least one of the processor(s) 940 may be packaged together with logic for one or more controller(s) of system control logic 920. For one embodiment, at least one of the processor(s) 940 may be packaged together with logic for one or more controllers of system control logic 920 to form a System in Package (SiP). For one embodiment, at least one of the processor(s) 940 may be integrated on the same die with logic for one or more controller(s) of system control logic 920. For one embodiment, at least one of the processor(s) 940 may be integrated on the same die with logic for one or more controller(s) of system control logic 920 to form a System on Chip (SoC). Each of the processors 940 may include an input for receiving data and an output for outputting data.

In various embodiments, the I/O devices 950 may include user interfaces designed to enable user interaction with the system 900, peripheral component interfaces designed to enable peripheral component interaction with the system 900, and/or sensors designed to determine environmental conditions and/or location information related to the system 900.

Figure 10:
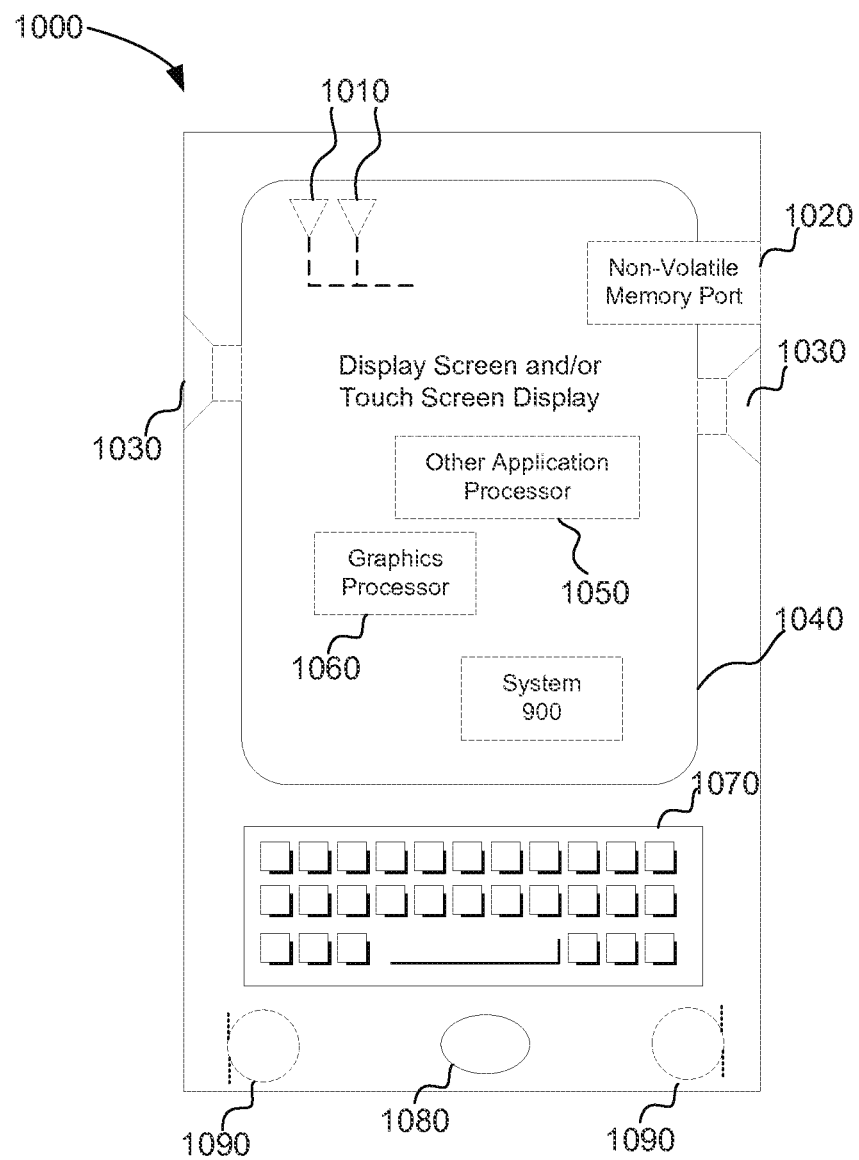
FIG. 10 shows an embodiment in which the system of FIG. 9 implements a wireless device such as UE.

FIG. 10 shows an embodiment in which the system 900 implements a wireless device 1000, such as user equipment (UE), a mobile station (MS), a mobile wireless device, a mobile communication device, a tablet, a handset, or other type of wireless device. The wireless device can include one or more antennas 1010 configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The device is capable of performing D2D communication with other proximal wireless devices both when in-coverage and out-of-coverage with respect to the wireless cellular network. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

The wireless device 1000 of FIG. 10 also provides an illustration of a microphone 1090 and one or more speakers 1030 that can be used for audio input and output from the wireless device. In various embodiments, the user interfaces could include, but are not limited to, a display 1040 (e.g., a liquid crystal display, a touch screen display, etc.), a speaker 1030, a microphone 1090, one or more cameras 1080 (e.g., a still camera and/or a video camera), a flashlight (e.g., a light emitting diode flash), and a keyboard 1070.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1060 to communicate with components of a positioning network, e.g., a global positioning system (GPS) satellite.

In various embodiments, the system 1000 may be a mobile computing device such as, but not limited to, a laptop computing device, a tablet computing device, a netbook, a mobile phone, etc. In various embodiments, system 1000 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium such that when the program code is loaded into and executed by a machine, such as a computer, the machine becomes an apparatus for practicing the various techniques according to the above described embodiments. In the case of program code execution on programmable devices such as a UE or a wireless device, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data.

One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that the functional units described in this specification have been labeled as modules, to highlight their implementation independence. Note that a module may be implemented, for example, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments may be referred to herein along with alternatives for the various components thereof. It is understood that such embodiments, examples, and alternatives are not to be construed as de facto equivalents of one another, but are to be considered as separate and autonomous representations of the embodiments.

Furthermore, the described features, structures, or characteristics may be combined in any suitable manner in one or more embodiments. In the following description, numerous specific details are provided, such as examples of layouts, distances, network examples, etc., to provide a thorough understanding of embodiments. One skilled in the relevant art will recognize, however, that embodiments can be practiced without one or more of the specific details, or with other methods, components, layouts, etc. In other instances, well-known structures, materials, or operations are not shown or described in detail to avoid obscuring aspects of the embodiments.

While the forgoing examples are illustrative of the principles of embodiments in one or more particular applications, it will be apparent to those of ordinary skill in the art that numerous modifications in form, usage and details of implementation can be made without the exercise of inventive faculty, and without departing from the principles and concepts of embodiments.

Embodiments provide a convenient and efficient way of managing in-band emission interference in D2D communications by performing resource allocation in the UE to dynamically allocate a time resource for a D2D communication depending upon a received signal metric such as a signal power measurement.

Interference, such as in-band emission interference is likely to be stronger when a wireless receiver receives one comparatively strong signal and one comparatively weak signal i.e. where there is a discrepancy in received signal strengths. This potentially problematical interference scenario is likely to arise where two transmitters have partially overlapping transmission ranges. In this case, UEs located in the intersection of the two transmission ranges that are able to receive both transmissions, and which are also located close to the periphery of one of the transmission ranges are likely to be most susceptible to the effects of in-band interference on the D2D communication. If the two transmitters are in close proximity to each other with substantially coincident transmission ranges then the signals from the two different transmitters should be of comparable strength and thus easy to distinguish from interference. Similarly, if the two transmitters are sufficiently far apart that there is no overlap in their transmission ranges then interference between signals from the two transmitters should not occur.

D2D communications can be directed, via appropriate radio resource allocation such that the transmissions are in a subset of the full available bandwidth, for example, 1 MHz (one LTE PRB has around 180 kHz bandwidth) rather than a full 10 MHz bandwidth. This allows the UE power to be focused upon a subset of the frequency spectrum rather than being distributed across a wider frequency bandwidth.

Resource allocation performed using time resource selection using evaluation of a signal metric (measuring signal characteristics of the received signal) according to embodiments:

exploits the distributed approach of D2D broadcast communication without any requirement for the introduction of new coordinator nodes (i.e. Cluster Heads or Peer Radio Heads) with extended resource management functions. This makes the architecture according to embodiments highly scalable. However, resource allocation according to the present technique may also be implemented by cluster heads; and the present technique shows better performance than the other distributed random access techniques. Comparing the "Proposed Distributed Method" according to the present technique to eNB/CH assisted approaches, it has a similar performance (see FIGS. 8A and 8B) and yet has a lower control overhead and higher scalability.

EXAMPLES

The following examples pertain to further embodiments.

Example 1 is device-to-device communication circuitry, for use in a device of a wireless communication network, the device being configured to transmit and receive device-to-device communications, the circuitry comprising:

synchronization establishing circuitry configured to acquire radio resource synchronization and to establish a time-frequency resource grid for a D2D communication, the time-frequency resource grid having a plurality of resource units for allocation to a D2D connection;

signal metric evaluation circuitry configured to evaluate at least one resource unit of a received signal using a signal metric when the time-frequency resource grid has been established; and radio resource selection circuitry configured to select a time resource of the time-frequency resource grid for allocation to a D2D communication depending upon a result of the resource unit evaluation.

Example 2 may be the subject matter of example 1, wherein the radio resource selection circuitry selects a subset of resource units of the resource grid as candidate transmission resource units by one of: (i) selecting a predetermined number of resource units of the resource grid having a lowest value of the signal metric; and (ii) selecting all resource units of the resource grid having a signal metric value less than a predetermined threshold.

Example 3 may be the subject matter of example 2, wherein the radio resource selection circuitry is configured to select a resource unit for allocation to the D2D communication from the subset comprising the candidate transmission resource units.

Example 4 may be the subject matter of any one of examples 1 to 3, wherein the radio resource selection circuitry is configured to use the resource unit evaluation to determine if a transmitter of the received signal corresponding to the at least one resource unit has a transmission range that partially overlaps a transmission range of a UE containing the device-to-device communication circuitry.

Example 5 may be the subject matter of any one of examples 1 to 4, wherein the radio resource selection circuitry is configured to use the resource unit evaluation to determine if a transmitter of the received signal corresponding to the at least one resource unit is located in close proximity to a device containing the device-to-device communication circuitry.

Example 6 may be the subject matter of any one of examples 1 to 5, wherein the radio resource selection circuitry is configured to select the time resource by processing the signal metric for the evaluated resource unit(s) by performing a comparison of the signal metric against at least one of an upper threshold value and a lower threshold value.

Example 7 may be the subject matter of example 6, wherein the radio resource selection circuitry is configured to select the time resource by selecting from at least a subset of time resources of the time-frequency resource grid currently available for allocation to a new D2D transmission, the time resource being selected to have the fewest constituent resource units for which the signal metric is evaluated to lie between the lower threshold value and the upper threshold value.

Example 8 may be the subject matter of example 6 or example 7, wherein the threshold value(s) are one of: configured by an eNB; configured by a cluster head UE; and autonomously calculated by a device containing the device-to-device communication circuitry.

Example 9 may be the subject matter of any one of examples 1 to 8, wherein the radio resource selection circuitry is configured to select a frequency sub-channel corresponding to the selected time resource by performing one of: a random selection of a time-frequency resource unit corresponding to the selected time resource; and selection of a time-frequency resource unit within the selected time resource based upon the corresponding signal metric value.

Example 10 may be the subject matter of any one of examples 1 to 9, wherein the signal metric evaluation circuitry is configured to calculate the signal metric based on energy measurements from at least one antenna of the device.

Example 11 may be the subject matter of any one of examples 1 to 10, wherein the time-frequency resource grid has a periodic structure and wherein the time resource selection is based on a signal metric evaluation in a measurement period and wherein the radio resource selection circuitry is configured to allocate to the D2D communication a time resource having a corresponding position to the selected time resource in the time resource grid in a period subsequent to the measurement period.

Example 12 may be the subject matter of example 11, wherein the period is an LTE radio frame and the resource unit comprises at least one LTE physical resource block.

Example 13 may be the subject matter of example 11 or example 12, wherein the time resource corresponds to an LTE subframe.

Example 14 may be the subject matter of any one of examples 1 to 13, wherein the signal metric comprises at least one of received signal power, received signal quality and received signal strength, taken jointly and severally in any and all combinations.

Example 15 may be the subject matter of any one of examples 1 to 14, wherein the device comprises one of: a UE, a picocell, a femtocell and a relay node.

Example 16 is a method of performing resource allocation for peer to peer communication between wireless equipment at the same hierarchical level of a wireless communication network, the method being performed by a wireless equipment and comprising:
    acquiring synchronization for D2D transmission and configuring an N by M time-frequency resource structure comprising N frequency sub-channels having a fixed sub-channel bandwidth by M time units having a fixed duration, the structure having M*N time-frequency resource entities, where M and N are integers greater than or equal to one;
    measuring for at least a subset of resource entities of the time-frequency resource structure, a signal characteristic of a signal received in the corresponding resource entity; and
    selecting one of the M time units of the time-frequency resource structure as a preferred time unit for allocation to a forthcoming D2D transmission by the wireless equipment, based upon an analysis of the signal characteristics of the at least a subset of the resource entities, the analysis providing an estimate of a proximity of a transmitter of the corresponding received signal to the wireless equipment performing the resource allocation.

Example 17 may be the subject matter of the example 16, wherein the measuring of the signal characteristics comprises applying at least one threshold value to estimate the proximity of the transmitter of the signal received in the corresponding resource entity.

Example 18 may be the subject matter of example 16 or example 17, wherein the signal characteristic is one of a signal power measurement a signal strength measurement and a signal quality measurement and wherein the at least one threshold value comprises an upper threshold PHT and wherein when the measured signal characteristic lies above the upper threshold PHT, a transmitter of the received signal is assumed to be close enough to have a substantially overlapping transmission range with the wireless equipment.

Example 19 may be the subject matter of example 17, wherein the at least one threshold value comprises a lower threshold value PLT and wherein when the measured signal characteristic has a value up to the lower threshold value a transmitter of the received signal is assumed to be far enough from the wireless equipment to have a substantially non-overlapping transmission range with the wireless equipment.

Example 20 may be the subject matter of example 19, wherein the signal measurement analysis comprises counting a number NT of resource entities within a given time unit having a signal characteristic $P_i$ such that $P_{LT} < P_i < P_{HT}$ and wherein the time unit selected as being preferred for allocation to a D2D transmission depends upon NT.

Example 21 may be the subject matter of example 20, wherein the selected time unit is a time unit that minimizes NT.

Example 22 may be the subject matter of any one of examples 16 to 21, comprising selecting for allocation to the D2D transmission a resource entity by selecting a frequency sub-channel within the selected time unit of the time-frequency resource structure by one of: random selection and depending upon the signal characteristic for the corresponding resource entity.

Example 23 may be the subject-matter of any one of examples 16 to 22, wherein the wireless equipment comprises one of: a UE, a picocell, a femtocell and a relay node.

Example 24 is a computer program product embodied on a non-transitory computer-readable medium comprising program instructions configured such that when executed by processing circuitry cause the processing circuitry to implement the method of any one of examples 16 to 23.

Example 25 is a UE comprising the device-to-device communication circuitry of any one of examples 1 to 15 and comprising transceiver circuitry for broadcasting a D2D signal according to a periodic repetition of the time-frequency resource structure using the a resource entity corresponding to the selected time unit.

Example 26 is device-to-device communication circuitry, for use in a UE of a wireless communication network, the circuitry comprising:
  means for establishing synchronization configured to acquire radio resource synchronization and to establish a time-frequency resource grid for a D2D communication, the time-frequency resource grid having a plurality of resource units for allocation to a D2D connection;
  means for evaluating at least one resource unit of a received signal using a signal metric when the time-frequency resource grid has been established; and
  means for selecting a time resource of the time-frequency resource grid for allocation to a D2D communication depending upon a result of the resource unit evaluation.

Example 27 may be the subject matter of example 26, wherein the means for selecting the time resource is configured to select for allocation to the D2D communication a frequency resource lying within the selected time resource.

Example 28 is a UE for use in a wireless communication network, the UE comprising:
  a touchscreen configured to receive input from a user for processing by the UE;
  a transceiver module arranged to enable device-to-device communication;
  synchronization establishing module arranged to acquire radio resource synchronization and to establish a time-frequency resource grid for a D2D communication, the time-frequency resource grid having a plurality of resource units for allocation to a D2D connection;
  a signal metric evaluation module arranged to evaluating at least one resource unit of a received signal using a signal metric when the time-frequency resource grid has been established; and
  radio resource selection module arranged to selecting a time resource of the time-frequency resource grid for allocation to a D2D communication depending upon a result of the resource unit evaluation.

Example 29 may be the subject matter of example 28, wherein the radio resource selection module is configured to select the time resource depending upon a comparison of at least a subset of the resource unit signal metric evaluations with a threshold.

Example 30 is computer readable medium comprising instructions, which, when executed, cause a processor to carry out the method of any one of examples 16 to 23.

Example 31 may be the subject matter of example 30, the medium being one of a storage medium and a transmission medium.

Example 32 is device-to-device communication circuitry substantially as hereinbefore described with reference to the accompanying drawings.

Example 33 is device-to-device communication method substantially as hereinbefore described with reference to the accompanying drawings.

Example 34 is a UE substantially as hereinbefore described with reference to the accompanying drawings.

The invention claimed is:

1. A device-to-device, D2D, communication circuitry, for use in a device of a wireless communication network, the device being configured to transmit and receive device-to-device communications, the circuitry comprising:
  synchronization establishing circuitry to acquire radio resource synchronization and to establish a time-frequency resource grid for a D2D communication, the time-frequency resource grid having a plurality of resource units for allocation to a D2D connection;
  signal metric evaluation circuitry to evaluate signal metrics of resource units of the plurality of resource units when the time-frequency resource grid has been established; and
  radio resource selection circuitry to compare the signal metrics to a lower threshold value and an upper threshold value, and select a time resource of the time-frequency resource grid for allocation to the D2D communication based on said comparison of the signal metrics to the lower threshold value and the upper threshold value,
  wherein the radio resource selection circuitry is to select the time resource by selecting from at least a subset of time resources of the time-frequency resource grid currently available for allocation to a new D2D transmission, the time resource being select to minimize a number of constituent resource units for which the signal metric is evaluated to lie between the lower threshold value and the upper threshold value.

2. The device-to-device communication circuitry of claim 1, wherein the radio resource selection circuitry selects a subset of resource units of the resource grid as candidate transmission resource units by:
  selecting a predetermined number of resource units of the resource grid having a lowest value of the signal metric; or
  selecting all resource units of the resource grid having a signal metric value less than the upper threshold value.

3. The device-to-device communication circuitry of claim 2, wherein the radio resource selection circuitry is to select a resource unit for allocation to the D2D communication from the subset comprising the candidate transmission resource units.

4. The device-to-device communication circuitry of claim 1, wherein the radio resource selection circuitry is to use a resource unit evaluation to determine if a transmitter of a received signal corresponding to a resource unit has a transmission range that partially overlaps a transmission range of a device containing the device-to-device communication circuitry.

5. The device-to-device communication circuitry of claim 1, wherein the radio resource selection circuitry is to use a resource unit evaluation to determine if a transmitter of a received signal corresponding to a resource unit is located in close proximity to a device containing the device-to-device communication circuitry.

6. The device-to-device communication circuitry of claim 1, wherein the upper and lower threshold values are:
  configured by an evolved node B, eNB;
  configured by a cluster head user equipment, UE; or
  autonomously calculated by a device containing the device-to-device communication circuitry.

7. The device-to-device communication circuitry of claim 1, wherein the radio resource selection circuitry is to select a frequency sub-channel corresponding to the selected time resource by performing:

a random selection of a time-frequency resource unit corresponding to the selected time resource; or selection of a time-frequency resource unit within the selected time resource based upon a corresponding signal metric value.

8. The device-to-device communication circuitry of claim 1, wherein the signal metric evaluation circuitry is to calculate the signal metric based on energy measurements from at least one antenna of the device.

9. The device-to-device communication circuitry of claim 1, wherein the time-frequency resource grid has a periodic structure and wherein the time resource selection is based on a signal metric evaluation in a measurement period and wherein the radio resource selection circuitry is to allocate to the D2D communication a time resource having a corresponding position to the selected time-frequency resource in the time resource grid in a period subsequent to the measurement period.

10. The device-to-device communication circuitry of claim 9, wherein the period is a Long Term Evolution, LTE, radio frame and the resource unit comprises at least one LTE physical resource block.

11. The device-to-device communication circuitry of claim 1, wherein the signal metric comprises or is based on received signal power, received signal quality, or received signal strength.

12. The device-to-device communication circuitry of claim 1, wherein the device comprises:
a user equipment;
a pico node;
a femto node; or
a relay node.

13. One or more non-transitory, computer-readable media having instructions that, when executed, cause a wireless equipment to allocate resources for peer-to-peer communication between wireless equipment at a same hierarchical level of a wireless communication network, to allocate resources, the wireless equipment is to:

acquire synchronization for device-to-device, D2D, transmission and configure an N by M time-frequency resource structure comprising N frequency sub-channels having a fixed sub-channel bandwidth by M time units having a fixed duration, the structure having M*N time-frequency resource entities, where M and N are integers greater than or equal to one;

measure for at least a subset of resource entities of the time-frequency resource structure, a signal characteristic of a signal received in the corresponding resource entity;

select one of the M time units of the time-frequency resource structure as a preferred time unit for allocation to a forthcoming D2D transmission by the wireless equipment, based upon an analysis of the signal characteristics of the at least a subset of the resource entities, the analysis based on a lower threshold $P_{LT}$ and an upper threshold $P_{HT}$ and an estimate of a proximity of a transmitter of the corresponding received signal to the wireless equipment, wherein the analysis is to further include counting a number, $N_T$, of resource entities within a given time unit having a signal characteristic $P_i$ such that $P_{LT} < P_i < P_{HT}$ and wherein the time unit selected as being preferred for allocation to a D2D transmission is a time unit that minimizes $N_T$.

14. The one or more non-transitory, computer-readable media of claim 13, wherein to measure the signal characteristic the wireless equipment is to apply the upper threshold $P_{HT}$ to estimate the proximity of the transmitter of the signal received in the corresponding resource entity.

15. The one or more non-transitory, computer-readable media of claim 14, wherein the signal characteristic is a signal power measurement, a signal strength measurement, or a signal quality measurement and wherein when the measured signal characteristic lies above the upper threshold $P_{HT}$, a transmitter of the received signal is determined to be close enough to have a substantially overlapping transmission range with the wireless equipment.

16. The one or more non-transitory, computer-readable media of claim 14, wherein when the measured signal characteristic has a value up to the lower threshold value $P_{LT}$, a transmitter of the received signal is determined to be far enough from the wireless equipment to have a substantially non-overlapping transmission range with the wireless equipment.

17. The one or more non-transitory, computer-readable media of claim 13, wherein the instructions, when executed, further cause the wireless equipment to select for allocation to the D2D transmission a resource entity by selecting a frequency sub-channel within the selected time unit of the time-frequency resource structure by:
random selection; or
depending upon the signal characteristic for the corresponding resource entity.

18. A device-to-device, D2D, communication circuitry, for use in a user equipment (UE) of a wireless communication network, the circuitry comprising:

means for establishing synchronization configured to acquire radio resource synchronization and to establish a time-frequency resource grid for a D2D communication, the time-frequency resource grid having a plurality of resource units for allocation to a D2D connection;

means for evaluating signal metrics of resource units of the plurality of resource units when the time-frequency resource grid has been established; and means for comparing the signal metrics to a lower threshold value and an upper threshold value; and means for selecting a time resource of the time-frequency resource grid for allocation to the D2D communication based on said comparison of the signal metrics to the lower threshold value and the upper threshold value, wherein means for selecting is to select the time resource by selecting from at least a subset of time resources of the time-frequency resource grid currently available for allocation to a new D2D transmission, the time resource being select to minimize a number of constituent resource units for which the signal metric is evaluated to lie between the lower threshold value and the upper threshold value.

19. The device-to-device communication circuitry of claim 18, wherein the means for selecting the time resource is to select for allocation to the D2D communication a frequency resource lying within the selected time resource.

* * * * *